Figure 1:
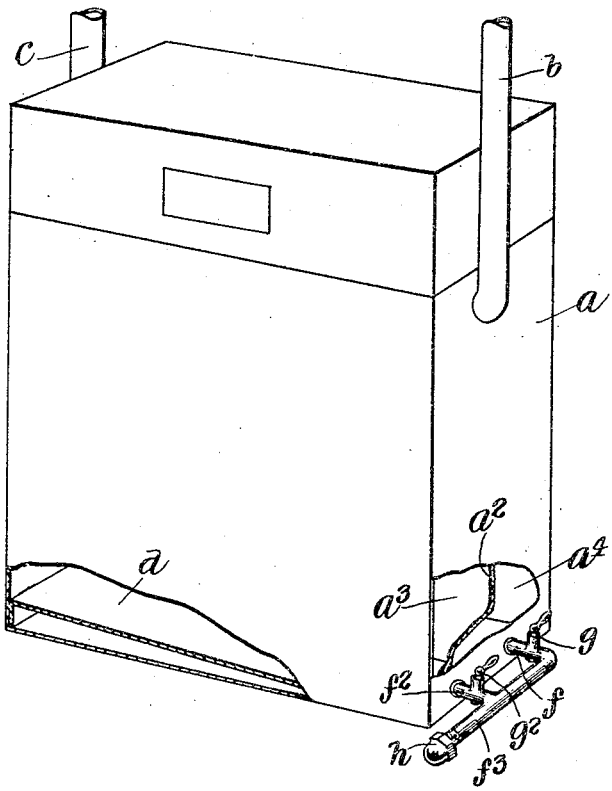

A. J. SMITH.
MEANS FOR DRAINING GAS METERS.
APPLICATION FILED DEC. 18, 1916.

1,257,414.

Patented Feb. 26, 1918.

Inventor
Austin J. Smith,
By his Attorneys

UNITED STATES PATENT OFFICE.

AUSTIN J. SMITH, OF BROOKLYN, NEW YORK.

MEANS FOR DRAINING GAS-METERS.

1,257,414.  Specification of Letters Patent.  Patented Feb. 26, 1918.

Application filed December 18, 1916. Serial No. 137,704.

*To all whom it may concern:*

Be it known that I, AUSTIN J. SMITH, a citizen of the United States, and residing at Brooklyn, in the county of Kings and State of New York, have invented certain new and useful Improvements in Means for Draining Gas-Meters, of which the following is a specification, such as will enable those skilled in the art to which it appertains to make and use the same.

This invention relates to gas meters and the object thereof is to provide improved means for draining such meters or discharging therefrom the water of condensation when desirable or necessary.

The invention is fully disclosed in the following specification, of which the accompanying drawing forms a part, in which the separate parts of my improvement are designated by suitable reference characters in each of the views, and in which:—

Figure 2:
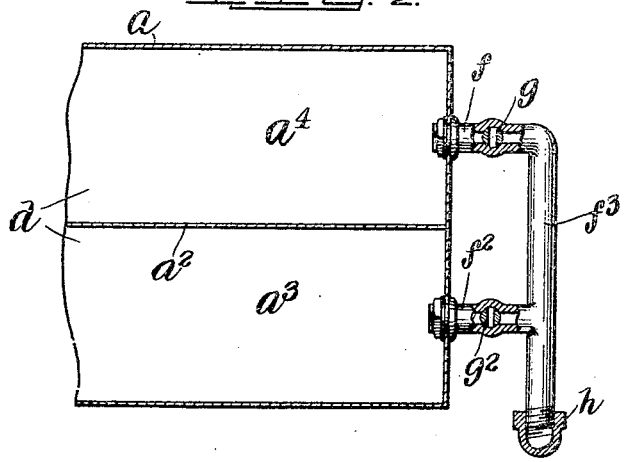

Figure 1 is a perspective view of an ordinary gas meter provided with my improvement; and, Fig. 2 a sectional plan view of one end portion of a meter.

In the drawing forming part of this specification, I have shown at $a$ an ordinary gas meter which is provided with the usual vertical partition $a^2$, whereby the meter is divided into the usual front and back compartments $a^3$ and $a^4$, and the top portion of the meter is provided with the usual inlet and exhaust pipes $b$ and $c$.

The mechanism of the meter which is located in the top thereof forms no part of my invention and is therefore not shown nor described.

In the practice of my invention, I place in the bottom of the compartments $a^3$ and $a^4$ supplemental drainage bottoms $d$ which are inclined downwardly from one side of the meter to the other, and in the side of the meter at the lower ends of the drainage bottoms $d$ is secured my improved drainage device comprising coupling branch pipes $f$ and $f^2$ provided with valves $g$ and $g^2$ and connected with, or formed integral with a main drainage pipe $f^3$ which when the drainage device is in use ranges parallel with the adjacent side of the meter and the back end of which is closed and the front end of which is provided with a detachable cap $h$.

Whenever it is desirable or necessary to drain the separate compartments of the meter, the valves $g$ and $g^2$ are opened and the cap $h$ detached and the water in the compartments $a^3$ and $a^4$ will be quickly discharged therefrom, as will be readily understood, and neither of the compartments $a^3$ and $a^4$ can be drained without first detaching the cap $h$, and either of said compartments may be drained separately as will also be understood.

Having fully described my invention what I claim as new and desire to secure by Letters Patent, is:—

The combination with a gas meter having a vertical partition dividing the interior of the meter into front and back compartments, of supplemental bottoms arranged in said compartments and inclined downwardly from one side of the meter to the other, and a drainage device comprising a main pipe having parallel branch pipes connected with the meter at the lower ends of said bottoms and provided with valves, said main pipe being closed at one end and provided at the other end with a detachable cap.

In testimony that I claim the foregoing as my invention I have signed my name in presence of the subscribing witnesses this 16th day of December, 1916.

AUSTIN J. SMITH.

Witnesses:
C. E. MULREANY,
H. E. THOMPSON.

Copies of this patent may be obtained for five cents each, by addressing the "Commissioner of Patents, Washington, D. C."